United States Patent
Kim et al.

(10) Patent No.: US 11,245,934 B1
(45) Date of Patent: Feb. 8, 2022

(54) SOFTWARE DEFINED NETWORKING

(71) Applicant: CABLE TELEVISION LABORATORIES, INC., Louisville, CO (US)

(72) Inventors: James Kim, Louisville, CO (US); Karthik Sundaresan, Boulder, CO (US); Thomas Kee, Louisville, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 2 days.

(21) Appl. No.: 16/922,547

(22) Filed: Jul. 7, 2020

Related U.S. Application Data

(63) Continuation of application No. 15/992,015, filed on May 29, 2018, now Pat. No. 10,979,741, which is a continuation of application No. 14/970,024, filed on Dec. 15, 2015, now abandoned.

(60) Provisional application No. 62/091,954, filed on Dec. 15, 2014.

(51) Int. Cl.
| | |
|---|---|
| *H04N 21/231* | (2011.01) |
| *H04N 21/238* | (2011.01) |
| *H04N 21/24* | (2011.01) |
| *H04N 21/643* | (2011.01) |
| *H04N 21/61* | (2011.01) |
| *H04N 21/2385* | (2011.01) |
| *H04N 21/241* | (2011.01) |

(52) U.S. Cl.
CPC ..... *H04N 21/23103* (2013.01); *H04N 21/238* (2013.01); *H04N 21/2402* (2013.01); *H04N 21/6118* (2013.01); *H04N 21/643* (2013.01); *H04N 21/2385* (2013.01); *H04N 21/241* (2013.01)

(58) Field of Classification Search
None
See application file for complete search history.

(56) References Cited

U.S. PATENT DOCUMENTS

| | | |
|---|---|---|
| 8,121,126 B1 | 2/2012 | Moisand et al. |
| 8,935,726 B2 | 1/2015 | Patel et al. |
| 9,131,255 B2 | 9/2015 | Smith |
| 9,325,597 B1 | 4/2016 | Clasen et al. |
| 2002/0054087 A1 | 5/2002 | Noll et al. |
| 2005/0281197 A1 | 12/2005 | Honda |
| 2007/0230369 A1 | 10/2007 | McAlpine |
| 2008/0013547 A1 | 1/2008 | Kiessig et al. |
| 2009/0265443 A1 | 10/2009 | Moribe et al. |
| 2013/0346541 A1 | 12/2013 | Codavalli |

(Continued)

*Primary Examiner* — Justin E Shepard
(74) *Attorney, Agent, or Firm* — PdZ Patent Law, PLLC

(57) ABSTRACT

Systems and methods presented herein provide for a software defined network (SDN) controller in a cable television system that virtualizes network elements in the cable television system to provide content delivery and data services through the virtualized network elements. In one embodiment, the SDN controller is operable in a cloud computing environment to balance data traffic through the virtualized network elements. For example, the SDN controller may abstract Layer 2 Control Protocol (L2CP) frame processing of the network elements into the cloud computing environment to relieve the network elements from the burdens of Ethernet frame processing. In this regard, the SDN controller comprises a L2CP decision module that determines how L2CP should be processed for the network elements in the cable television system.

15 Claims, 6 Drawing Sheets

(56) References Cited

U.S. PATENT DOCUMENTS

| | | |
|---|---|---|
| 2014/0337500 A1 | 11/2014 | Lee |
| 2015/0106526 A1 | 4/2015 | Arndt |
| 2015/0271268 A1 | 9/2015 | Finkelstein |
| 2015/0350102 A1 | 12/2015 | Leon-Garcia et al. |

SOFTWARE DEFINED NETWORKING

CROSS-REFERENCE TO RELATED APPLICATIONS

This patent application is a continuation of U.S. patent application Ser. No. 15/992,015 (filed May 29, 2018), which is a continuation of U.S. patent application Ser. No. 14/970,024 (filed Dec. 15, 2015), which application claims priority to, and thus the benefit of, an earlier filing date from, U.S. Provisional Patent Application No. 62/091,954 (filed Dec. 15, 2014). The entire contents of each of the above-mentioned patent applications are hereby incorporated by reference.

BACKGROUND

Cable television systems employ a network of devices (e.g., network elements) for delivering television programming to paying subscribers, typically by way of radio frequency (RF) signals transmitted through coaxial cables and/or light pulses through fiber-optic cables. Other services provided by cable television systems include high-speed Internet, home security, and telephone. Multiple television channels are distributed to subscriber residences from a "headend". Typically, each television channel is translated to a different frequency at the headend, giving each channel a different frequency "slot" so that the television signals do not interfere with one another. At the subscriber's residence, a desired channel is selected with the user's equipment (e.g., a cable modem (CM), a set-top box, a television, a computer, etc.; collectively referred to herein as "user equipment", or "UE") and displayed on a screen. These are referred to as the "downstream" channels in a cable television system. "Upstream" channels in the system send data from the UE to the headend for various reasons including pay-per-view requests, Internet uploads and communication, and cable telephone service.

With the various forms of UEs, device protocols, content deliveries, and networks, data control has become exceptionally complex and difficult. For example, coordinating content deliveries from multiple independently operating network elements to an individual UE in a cable television network creates multiple layers of messaging and unbalanced traffic flows which can congest portions of the network.

SUMMARY

Systems and methods presented herein provide a software defined network (SDN) controller in a cable television system that virtualizes network elements in the cable television system and provides content delivery and data services through the virtualized network elements. In one embodiment, the SDN controller is operable in a cloud computing environment to balance data traffic through the virtualized network elements. For example, the SDN controller may abstract Layer 2 Control Protocol (L2CP) frame processing of the network elements into the cloud computing environment to relieve the network elements from the burdens of Ethernet frame processing. In this regard, the SDN controller comprises a L2CP decision module that determines how L2CP should be processed for the network elements in the cable television system.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
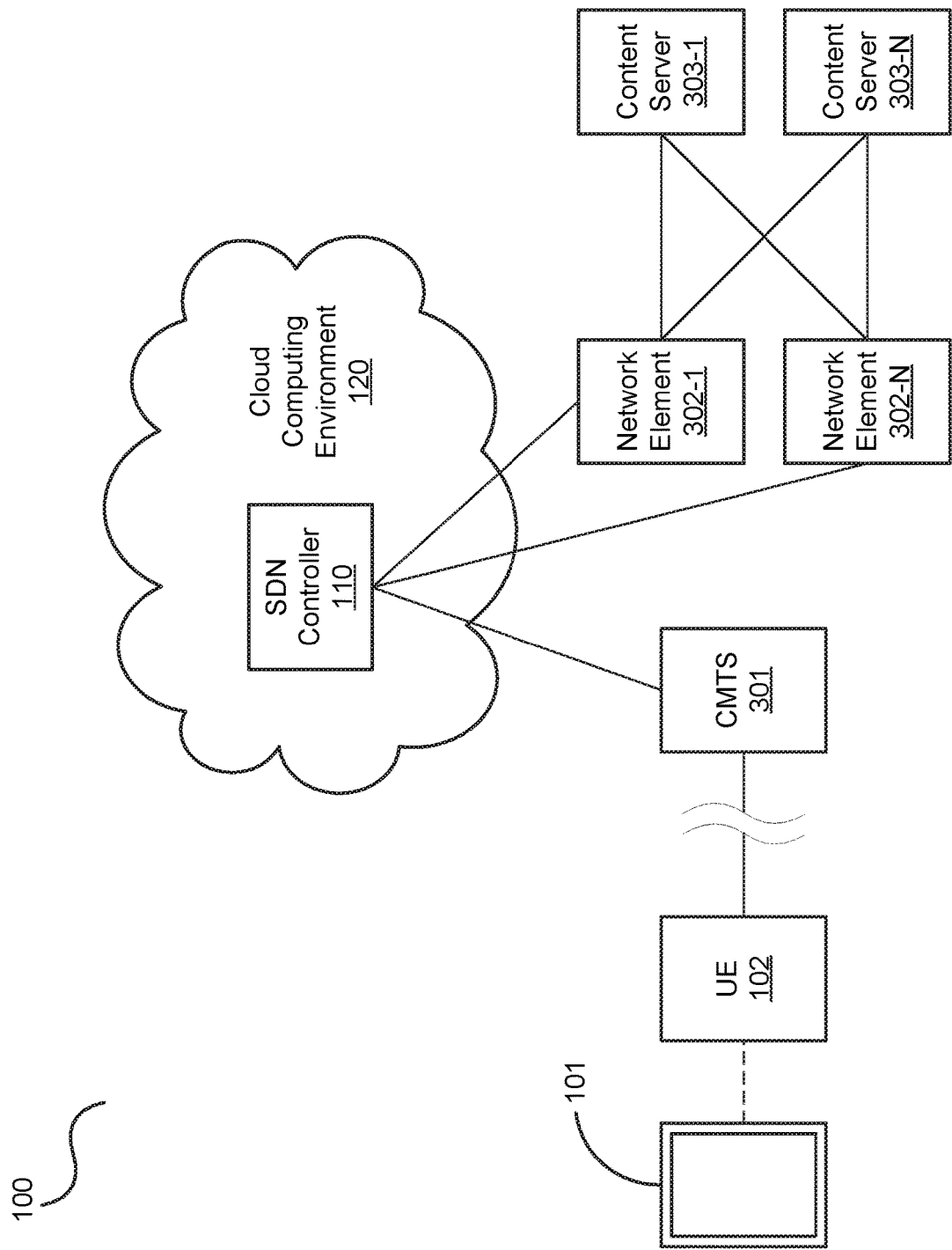
FIG. 1 is a block diagram of an exemplary cable television system employing a software defined network (SDN) controller.

FIG. 1 is a block diagram of a cable television system 100 employing a software defined network (SDN) controller 110 in a cloud computing environment 120. The SDN controller 110 allows a cable television network to manage its network services through the abstraction of higher-level functionality. In this regard, the SDN controller 110 decouples decisions regarding where traffic is sent by virtualizing network elements and storage infrastructure of the cable television system 100. As such, the SDN controller 110 can "shape" and balance the data traffic associated with content deliveries and other services for a subscriber's UE 102 and end device 101 (e.g., a tablet computer, the computer, a cell phone, television, etc.). This allows the cable television system 100 to manage data traffic from a centralized control console in the cloud computing environment 120.

In this embodiment, the SDN controller 110 virtualizes a plurality of network elements 302-1-302-N in the cable television system 100 (where the reference "N" merely indicates an integer greater than "1" and not necessarily equal to any other "N" reference designated herein). The network elements 302 are communicatively coupled to a plurality of content servers 303-1-303-N. The content servers 303 store content to be consumed by subscribers of the cable television system 100. For example, the content servers 303 may store movies, television shows, advertisements, and the like that a subscriber can view through their UEs 102 and/or end devices 101. The UEs 102 are communicatively coupled to the CMTS 301 as shown and described in FIG. 2.

The SDN controller 110 balances the traffic associated with the content being delivered from the content servers 303 through the virtualized network elements 302. For example, when a subscriber requests certain content, the SDN controller 110 having full network topology identifies a path from the content servers 303 to the UE 102 through the network elements 302. The SDN controller 110 determines the bandwidth capabilities of the content and the network elements 302 to identify a data path for the content to the UE 102. Thus, the SDN controller 110 is any combination of device(s) and software operable within a cloud computing environment 120 to virtualize network elements in a cable television system for the purposes of controlling traffic in the cable television system.

Figure 2:
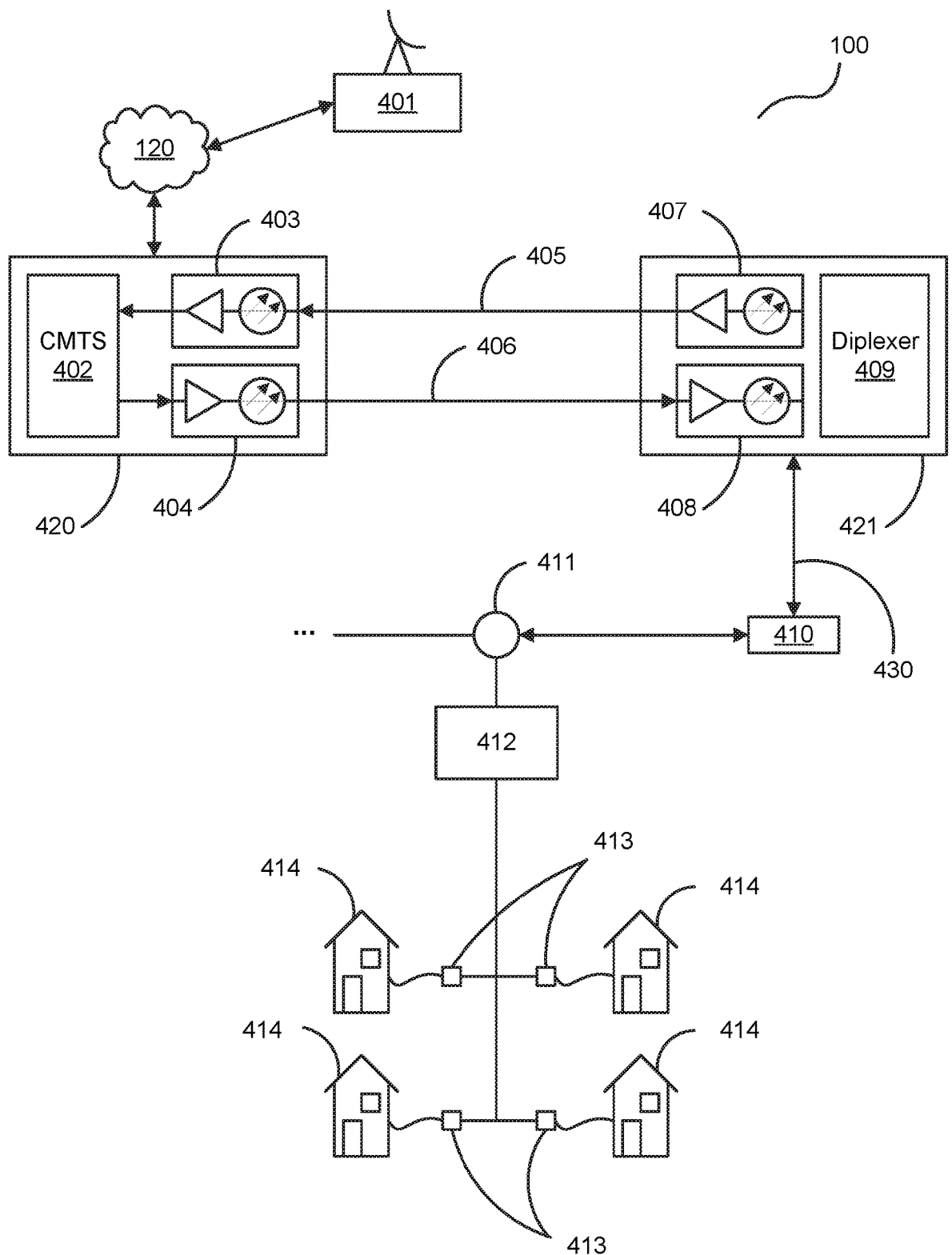
FIG. 2 is a more detailed block diagram of a cable television system.

FIG. 2 is a more detailed block diagram of the cable television system 100. The SDN controller 110 of the cloud computing environment 120 is generally configured proximate to an upstream hub 420 of the cable television system 100. The hub 420 includes a Cable Modem Termination System (CMTS) 301, an electrical to optical converter 404, and an optical to electrical converter 403. The hub 420 provides television programming and the high speed data services to subscribers of the cable television system 100. For example, antennas at a headend 401 may receive television signals that are converted as necessary and transmitted to the hub 420 through a plurality of virtualized network elements in the cloud computing environment 120 controlled by the SDN controller 110. The cloud computing environment 120 may also be coupled to an Internet backbone to provide Internet and other data services to the subscribers through the hub 420.

An upstream link of the cable television communication system 100 may provide the high speed data services being delivered over devices conforming to the Data Over Cable Service Interface Specification (DOCSIS) specification. The hub 420 is coupled to a downstream node 421 via optical communication links 405 and 406. The node 421 is similarly configured with an optical to electrical converter 408 and an electrical to optical converter 407.

Several hubs may be connected to a single headend 401 and the hub 420 may be connected to several nodes 421 by fiber optic cable links 405 and 406. The CMTS 301 may be configured in the headend 401 or in the hub 420. The fiber optic links 405 and 406 are typically driven by laser diodes, such as Fabry Perot and distributed feedback laser diodes.

Downstream, in homes and businesses are CMs (i.e., UEs 102, not shown). The CM acts as a host for an Internet Protocol (IP) device such as personal computer. Transmissions from the CMTS 301 to the CM are carried over the downstream portion of the cable television communication system generally from 54 to 860 MHz. Downstream digital transmissions are continuous and are typically monitored by many CMs. Upstream transmissions from the CMs to the CMTS 301 are typically carried in the 5-42 MHz frequency band, the upstream bandwidth being shared by the CMs that are on-line. However, with greater demands for data, additional frequency bands and bandwidths are continuously being considered and tested, including those frequency bands used in the downstream paths.

The CMTS 301 connects the local CM network to the Internet backbone. The CMTS 301 connects to the downstream path through the electrical to optical converter 404 that is connected to the fiber optic cable 406, which in turn, is connected to the optical to electrical converter 408 at the node 421. The signal is transmitted to a diplexer 409 that combines the upstream and downstream signals onto a single cable. The diplexer 409 allows the different frequency bands to be combined onto the same cable. The downstream channel width in the United States is generally 6 megahertz with the downstream signals being transmitted in the 54 to 860 MHz band. Upstream signals are presently transmitted between 5 and 42 MHz, but again other larger bands are being considered to provide increased capacity.

After the downstream signal leaves the node 421, the signal is typically carried by a coaxial cable 430. At various stages, a power inserter 410 may be used to power the coaxial line equipment, such as amplifiers or other equipment. The signal may be split with a splitter 411 to branch the signal. Further, at various locations, bi-directional amplifiers 412 may boost and even split the signal. Taps 413 along branches provide connections to subscriber's homes 414 and businesses.

Upstream transmissions from subscribers to the hub 420/headend 401 occur by passing through the same coaxial cable 430 as the downstream signals, in the opposite direction on a different frequency band. The upstream signals are sent typically utilizing Quadrature Amplitude Modulation (QAM) with forward error correction. The upstream signals can employ any level of QAM, including 8 QAM, 32 QAM, 64 QAM, 128 QAM, and 256 QAM. Modulation techniques such as Synchronous Code Division Multiple Access (S-CDMA) and Orthogonal Frequency Division Multiple Access (OFDMA) can also be used. Of course, any type of modulation technique can be used, as desired.

Transmissions, in this embodiment, are typically sent in a frequency/time division multiplexing access (FDMA/TDMA) scheme, as specified in the DOCSIS standards. The diplexer 409 splits the lower frequency signals from the higher frequency signals so that the lower frequency, upstream signals can be applied to the electrical to optical converter 407 in the upstream path. The electrical to optical converter 407 converts the upstream electrical signals to light waves which are sent through fiber optic cable 405 and received by optical to electrical converter 403 in the node 420.

Figure 3:
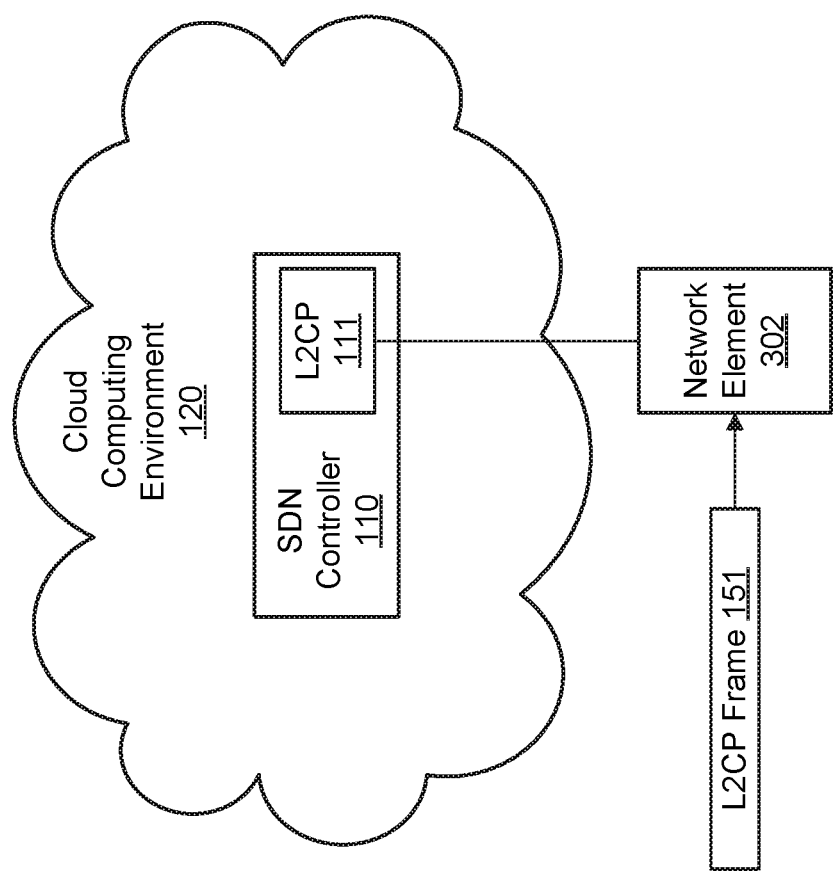
FIG. 3 is a block diagram of the SDN controller controlling the processing of an L2CP frame through a network element in the cable television system.

FIG. 3 is a block diagram of the SDN controller 110 controlling the processing of an L2CP (Layer 2 Control Protocol) frame 151 through a network element 302 in the cable television system 100. In this embodiment, the SDN controller 110 comprises an L2CP module 111 that handles L2CP processing requirements to abstract L2CP functionality into the cloud computing environment 120. Thus, network elements 302 operating in the cable television system 100 are relieved of L2CP processing and decisions to further assist in the balancing of the data traffic of the cable television system 100.

Generally, devices complying with the L2CP standards become outdated when the standard is changed. By abstracting the functionality into the cloud computing environment 120, the SDN controller 110 is operable to ensure that changes to L2CP standards do not need to be propagated to each network element 302 in the cable television system 100. For example, the Metro Ethernet Forum (MEF) defines the specification that deals with L2CP frame handling. The specification requires equipment vendors to update their equipment to comply with the standard is updated. However, cable television system networks are quite large and complex. These networks are therefore difficult to update when standards change. The SDN controller 110 manages these updates and performs the L2CP processing and relays the information to various network elements 302 in the cable television system 100.

Figure 4:
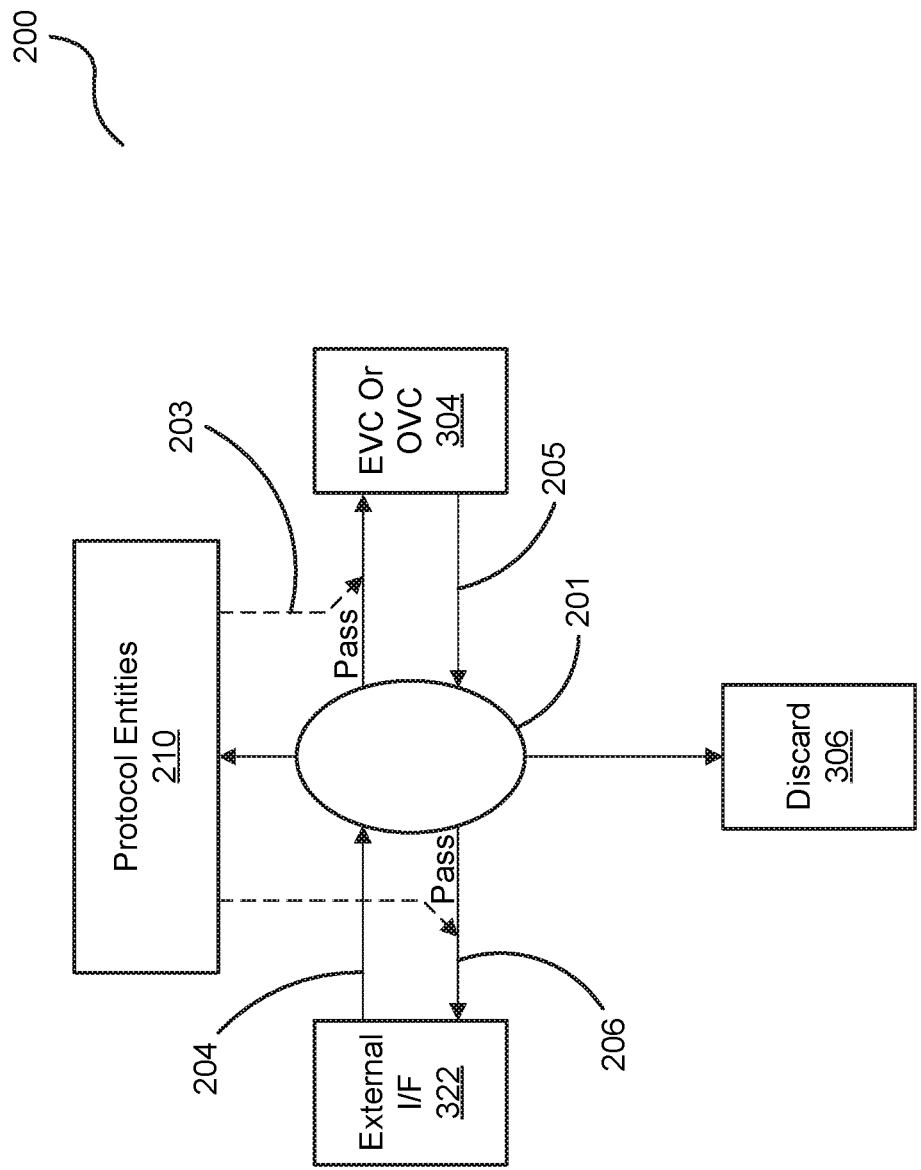
FIG. 4 is an exemplary processing diagram of the SDN controller.

FIG. 4 is an exemplary processing diagram that illustrates how the L2CP processing is abstracted into the L2CP module 111 of the SDN controller 110. The L2CP module 111 resolves various networking issues by describing behavior as ingress actions (204) or egress actions (206) that take place at an external interface. A decision node 201 makes decisions on how L2CP frames 151 are processed through the network elements 302. For example, the decision node 201 determines how an L2CP frame 151 is processed by an external interface 322 of the network element 302. The L2CP module 111 abstracts this functionality into the SDN controller 110 in the cloud computing environment 120.

Some L2CP frames 151 that enter the decision node 201 from the external interface 322 are processed by L2CP module 111 and passed to the virtual connection 304 (i.e., Ethernet Virtual Connections, "EVCs", or Operator Virtual Connections, "OVCs"). Other L2CP frames 151 are "peered" (203) by redirecting the frames to a protocol entity 210. And yet other L2CP frames 151 are discarded 306. Each of these actions depends upon the destination address, the protocol identifier, and configuration values of the L2CP service attributes within any given L2CP frame 151. In any case, once a decision is made by the L2CP module 111 of the SDN controller 110, that information is impressed upon the network element 302 to which the L2CP frame 151 was directed.

Figure 5:
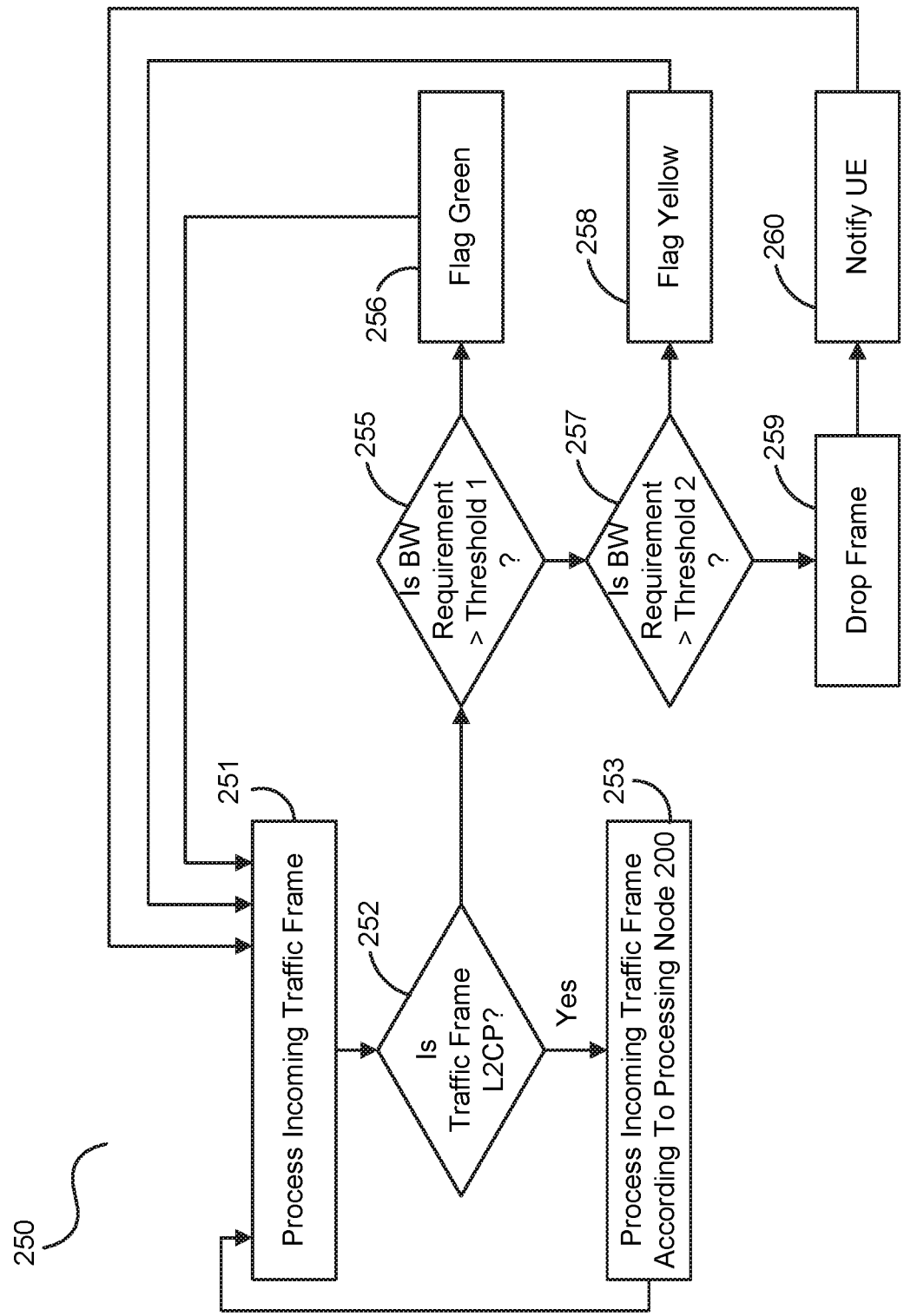
FIG. 5 is a flowchart illustrating an exemplary process of the SDN controller.

FIG. 5 is a flowchart illustrating an exemplary process 250 of the SDN controller 110. The process 250 illustrates how the SDN controller 110 is operable to identify and process various types of frames arriving at the network elements 302. For example, by virtualizing the network elements 302 in the cable television system 100, the SDN controller 110 is operable to detect each of the various types of frames arriving at each network element under control of the SDN controller 110. In this regard, the SDN controller 110 processes an incoming traffic frame, in the process element 251, and determines whether that frame is an L2CP frame 151 or an Ethernet frame carrying data traffic, in the process element 252. If the inbound frame is an L2CP frame 151, then the SDN controller 110 processes the frame via the L2CP module 111 according to the processing diagram of FIG. 4, in the process element 253. In this regard, the SDN controller 110 passes, peers, or discards the L2CP frame 151, in the process element 253.

If the frame is not an L2CP frame, the SDN controller 110 performs a threshold evaluation on the data traffic of the frames for the purposes of balancing traffic through the network elements. The SDN controller 110 marks Ethernet frames based on the bandwidth profile before allowing them to be transferred. For example, the SDN controller 110 can receive information about an inbound data frame from a network element 302 and instruct the network element 302 to flag the frames and/or give instructions to handle those frames according to a particular bandwidth profile of the frames.

Ethernet services of the network elements 302 in the cable television system 100 can be generally classified into two categories of quality of service (QoS): committed information rate (CIR)/committed burst size (CBS) and excess information rate (EIR)/excess burst size (EBS). CIR/CBS service guarantees its user a fixed amount of bandwidth/burst size. EIR/EBS service offers best-effort only transport. This relates to the cable television system 100's objective of offering a maximum amount of best-effort EIR/EBS services over its network while reliably serving its committed CIR/CBS services.

As different levels of QoS exist, balancing traffic through the cable television network becomes complex. For example, network elements 302 in the cable television system 100 previously had to process the incoming frames and determine the level of QoS within that frame. In this embodiment, the SDN controller 110 processes the incoming frames to the network elements 302, determines the level of QoS within those frames, and flags them with markers that the network elements 302 can identify as "colors" without having to extract the information from the frames.

The SDN controller 110 flags the frames with markings of green, yellow, or red. Green frames indicate that the frames are within CIR/CBS bandwidth settings. Yellow frames indicate that the frames are exceeding CIR/CBS but not exceeding EIR/EBS. Red frames indicate that the frames that are over EIR/EBS values.

In this regard, the SDN controller 110 processes the incoming data frame and determines whether it comprises a bandwidth or burst size greater than the bandwidth/burst size threshold "1" (i.e., the CIR/CBS), in the process element 255. If not, the SDN controller 110 flags the frame as "green", in the process element 256, and allows it to pass through the network element 302. If the incoming data frame comprises a bandwidth or burst size greater than the bandwidth/burst size threshold "1", then the SDN controller 110 determines whether it is greater than the bandwidth/burst size threshold "2" (i.e., the EIR/EBS), in the process element 257. If not, the SDN controller 110 flags the frame as yellow, in the process element 258, and allows it to pass through the network element 302. However, the SDN controller 110 monitors the yellow frames to determine whether the QoS needs to be changed. The flagged frames (i.e., process elements 256 and 258) are then sent to egress, by the SDN controller 110.

If the bandwidth or burst size of the frame is greater than the bandwidth/burst size threshold "2", then the SDN controller 110 drops the frame, in the process element 259, and notifies the receiving network element 302 that the frame has been dropped, in the process element 260. In whatever instance, the SDN controller 110 continues to monitor inbound frames of the network elements 302 under its control to abstract the processing thereof into the cloud computing environment 120.

Figure 6:
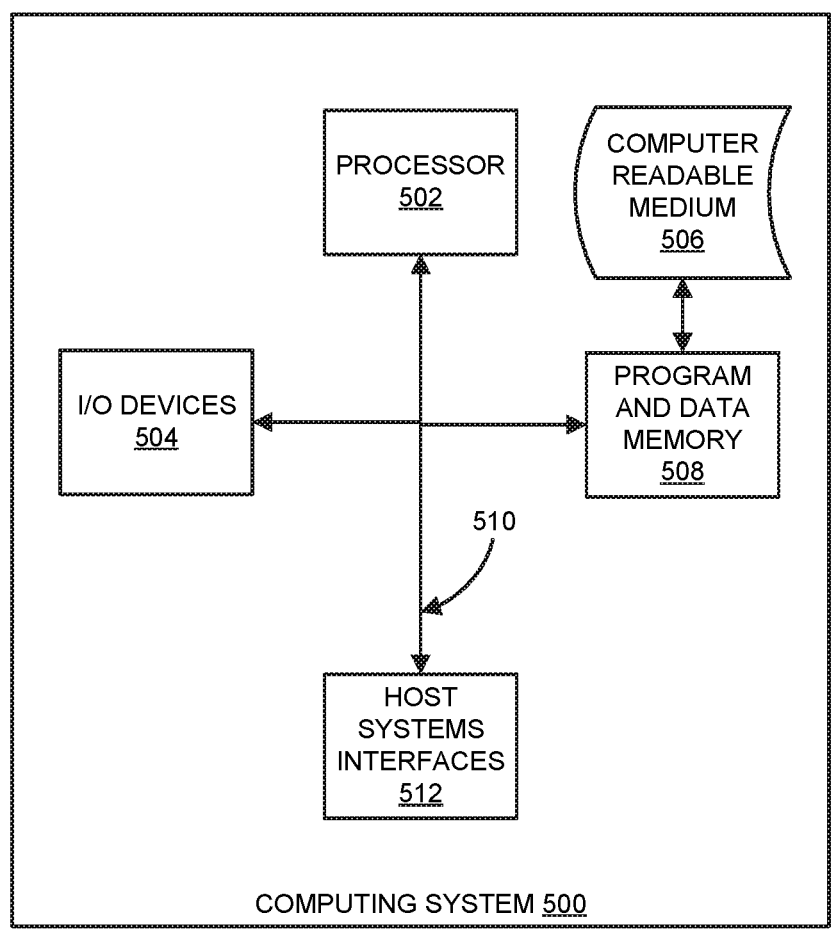
FIG. 6 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 500 in which a computer readable medium 506 may provide instructions for performing any of the methods disclosed herein. For example the computer readable medium 506 may provide program code for use by or in connection with a computer or any instruction execution system to perform the methods disclosed herein. For the purposes of this description, the computer readable medium 506 can be any apparatus that can tangibly store the program for use by or in connection with the instruction execution system, apparatus, or device, including the computer system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the computing system 500 to become coupled to other data processing systems, such as through host systems interfaces 512, or remote printers or storage devices through intervening private or public networks. Modems, cable modem and Ethernet cards are just a few of the currently available types of network adapters.

What is claimed is:

1. A method for processing a traffic frame in a communication network using a software defined network (SDN) controller, comprising:
    instantiating, by the SDN controller, a virtualization of a network element under control of the SDN controller;
    determining, from the virtualization of the network element, that a first incoming traffic frame at the network element is carrying data traffic;
    in response to determining that the first incoming traffic frame is carrying data traffic, determining a bandwidth profile of the first incoming traffic frame; and
    flagging the first incoming traffic frame with a marker identifying a quality of service (QoS) level of the first incoming traffic frame, according to the bandwidth profile of the first incoming traffic frame.

2. The method of claim 1, further comprising sending the first incoming traffic frame to egress of the SDN controller, after flagging the first incoming traffic frame.

3. The method of claim 1, wherein determining the bandwidth profile of the first incoming traffic frame comprises determining whether a bandwidth requirement of the first incoming traffic frame exceeds a first threshold value.

4. The method of claim 3, wherein flagging the first incoming traffic frame comprises flagging the first incoming traffic frame with a first marker identifying a first QoS level of the first incoming traffic frame, in response to determining that the bandwidth requirement of the first incoming traffic frame does not exceed the first threshold value.

5. The method of claim 3, wherein determining the bandwidth profile of the first incoming traffic frame further comprises determining whether the bandwidth requirement of the first incoming traffic frame exceeds a second threshold value, in response to determining that the bandwidth requirement of the first incoming traffic frame exceeds the first threshold value.

6. The method of claim 5, wherein flagging the first incoming traffic frame comprises flagging the first incoming traffic frame with a second marker identifying a second QoS level of the first incoming traffic frame, in response to determining that the bandwidth requirement of the first incoming traffic frame does not exceed the second threshold value.

7. The method of claim 5, wherein:
    the first threshold value represents an upper end of committed information rate (CIR)/committed burst size (CBS) bandwidth settings; and
    the second threshold value represents an upper end of excess information rate (EIR)/excess burst size (EBS) bandwidth settings.

8. The method of claim 3, wherein the first threshold value represents an upper end of committed information rate (CIR)/committed burst size (CBS) bandwidth settings.

9. The method of claim 1, further comprising:
    determining, from the virtualization of the network element, that a second incoming traffic frame at the network element is a Layer 2 Control Protocol (L2CP) frame; and
    in response to determining that the second incoming traffic frame is a L2CP frame, processing the L2CP frame in an L2CP module of the SDN controller.

10. The method of claim 9, further comprising updating the L2CP module according to a L2CP frame handling specification.

11. A method for processing a traffic frame in a communication network using a software defined network (SDN) controller, comprising:
    instantiating, by the SDN controller, a virtualization of a network element under control of the SDN controller;
    determining, from the virtualization of the network element, that a first incoming traffic frame at the network element is carrying data traffic;
    in response to determining that the first incoming traffic frame is carrying data traffic, determining that a bandwidth requirement of the first incoming traffic frame exceeds both a first threshold value and a second threshold value; and
    in response to the determining that the bandwidth requirement of the first incoming traffic frame exceeds both the first threshold value and the second threshold value, dropping the incoming traffic frame by the SDN controller.

12. The method of claim 11, further comprising transmitting from the SDN controller to the network element a notification that the SDN controller dropped the first incoming traffic frame.

13. The method of claim 11, further comprising:
    determining, from the virtualization of the network element, that a second incoming traffic frame at the network element is a Layer 2 Control Protocol (L2CP) frame;
    in response to determining that the second incoming traffic frame is a L2CP frame, processing the L2CP frame in an L2CP module of the SDN controller.

14. The method of claim 13, further comprising updating the L2CP module according to a L2CP frame handling specification.

15. The method of claim 11, wherein:
    the first threshold value represents an upper end of committed information rate (CIR)/committed burst size (CBS) bandwidth settings; and
    the second threshold value represents an upper end of excess information rate (EIR)/excess burst size (EBS) bandwidth settings.

* * * * *